(12) United States Patent
Benbasat et al.

(10) Patent No.: US 9,329,723 B2
(45) Date of Patent: May 3, 2016

(54) RECONSTRUCTION OF ORIGINAL TOUCH IMAGE FROM DIFFERENTIAL TOUCH IMAGE

(75) Inventors: Ari Y. Benbasat, San Francisco, CA (US); William Matthew Vieta, Santa Clara, CA (US); Wayne Carl Westerman, Burlingame, CA (US); Steven Porter Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 358 days.

(21) Appl. No.: 13/448,182

(22) Filed: Apr. 16, 2012

(65) Prior Publication Data

US 2013/0271427 A1 Oct. 17, 2013

(51) Int. Cl.
G06F 3/041 (2006.01)

(52) U.S. Cl.
CPC .................................. *G06F 3/0418* (2013.01)

(58) Field of Classification Search
CPC .................. G06F 3/041–3/047; G06F 3/04883
USPC .................................................. 345/173–178
See application file for complete search history.

(56) References Cited

U.S. PATENT DOCUMENTS

| | | | |
|---|---|---|---|
| 4,550,221 A | 10/1985 | Mabusth | |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 5,914,465 A | 6/1999 | Allen et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,456,952 B1 | 9/2002 | Nathan | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |

(Continued)

FOREIGN PATENT DOCUMENTS

| | | |
|---|---|---|
| EP | 1 717 677 A2 | 11/2006 |
| JP | 2000-163031 A | 6/2000 |

(Continued)

OTHER PUBLICATIONS

International Search Report mailed Aug. 6, 2013, for PCT Application No. PCT/US2013/036662, filed Apr. 15, 2013, three pages.

(Continued)

*Primary Examiner* — Ariel Balaoing
*Assistant Examiner* — Christopher Kohlman
(74) *Attorney, Agent, or Firm* — Morrison & Foerster LLP

(57) ABSTRACT

Reconstruction of an original touch image from a differential touch image is disclosed. Reconstruction can include aligning columns of the differential touch image relative to each other and aligning the image to a baseline DC value. The column and baseline alignment can be based on the differential image data indicative of no touch or hover, because such data can more clearly show the amount of alignment needed to reconstruct the original image. The reconstruction can be performed using the differential image data alone. The reconstruction can also be performed using the differential image data and common mode data indicative of the missing image column average.

25 Claims, 13 Drawing Sheets

(56) References Cited

U.S. PATENT DOCUMENTS

| | | | |
|---|---|---|---|
| 7,337,085 | B2 | 2/2008 | Soss |
| 7,504,833 | B1 | 3/2009 | Seguine |
| 7,663,607 | B2 | 2/2010 | Hotelling et al. |
| 7,719,523 | B2 | 5/2010 | Hillis |
| 8,026,904 | B2 | 9/2011 | Westerman |
| 8,045,783 | B2 | 10/2011 | Lee et al. |
| 8,125,312 | B2 | 2/2012 | Orr |
| 8,479,122 | B2 | 7/2013 | Hotelling et al. |
| 2003/0164820 | A1 | 9/2003 | Kent |
| 2003/0210235 | A1 | 11/2003 | Roberts |
| 2004/0188151 | A1 | 9/2004 | Gerpheide et al. |
| 2005/0012724 | A1 | 1/2005 | Kent |
| 2006/0026521 | A1 | 2/2006 | Hotelling et al. |
| 2006/0197753 | A1 | 9/2006 | Hotelling |
| 2006/0202969 | A1 | 9/2006 | Hauck |
| 2006/0238522 | A1 | 10/2006 | Westerman et al. |
| 2006/0267953 | A1 | 11/2006 | Peterson et al. |
| 2006/0279548 | A1 | 12/2006 | Geaghan |
| 2006/0293864 | A1 | 12/2006 | Soss |
| 2007/0023523 | A1 | 2/2007 | Onishi |
| 2007/0075982 | A1* | 4/2007 | Morrison et al. ............. 345/173 |
| 2007/0268273 | A1 | 11/2007 | Westerman et al. |
| 2007/0268275 | A1 | 11/2007 | Westerman et al. |
| 2008/0036742 | A1 | 2/2008 | Garmon |
| 2008/0042986 | A1 | 2/2008 | Westerman et al. |
| 2008/0042987 | A1 | 2/2008 | Westerman et al. |
| 2008/0047764 | A1 | 2/2008 | Lee et al. |
| 2008/0062151 | A1 | 3/2008 | Kent |
| 2008/0136792 | A1 | 6/2008 | Peng et al. |
| 2008/0158146 | A1 | 7/2008 | Westerman |
| 2008/0158172 | A1 | 7/2008 | Hotelling et al. |
| 2008/0158174 | A1 | 7/2008 | Land et al. |
| 2008/0158181 | A1 | 7/2008 | Hamblin et al. |
| 2008/0158182 | A1 | 7/2008 | Westerman |
| 2008/0158185 | A1 | 7/2008 | Westerman |
| 2008/0162996 | A1 | 7/2008 | Krah et al. |
| 2008/0309626 | A1 | 12/2008 | Westerman et al. |
| 2008/0309632 | A1 | 12/2008 | Westerman et al. |
| 2009/0020343 | A1 | 1/2009 | Rothkopf et al. |
| 2009/0114456 | A1 | 5/2009 | Wisniewski |
| 2009/0128516 | A1 | 5/2009 | Rimon et al. |
| 2009/0135157 | A1 | 5/2009 | Harley |
| 2009/0160787 | A1 | 6/2009 | Westerman et al. |
| 2009/0174676 | A1* | 7/2009 | Westerman .................... 345/173 |
| 2009/0174688 | A1 | 7/2009 | Westerman |
| 2010/0079401 | A1 | 4/2010 | Staton |
| 2011/0199105 | A1 | 8/2011 | Otagaki et al. |
| 2011/0227874 | A1 | 9/2011 | Faahraeus et al. |
| 2011/0241907 | A1 | 10/2011 | Cordeiro |
| 2011/0261005 | A1* | 10/2011 | Joharapurkar et al. ....... 345/174 |
| 2011/0261007 | A1* | 10/2011 | Joharapurkar et al. ....... 345/174 |
| 2011/0310064 | A1 | 12/2011 | Keski-Jaskari et al. |
| 2012/0262395 | A1 | 10/2012 | Chan |

FOREIGN PATENT DOCUMENTS

| | | |
|---|---|---|
| JP | 2002-342033 A | 11/2002 |
| WO | WO-99/35633 A2 | 7/1999 |
| WO | WO-99/35633 A3 | 7/1999 |
| WO | WO-2006/020305 A2 | 2/2006 |
| WO | WO-2007/089766 A2 | 8/2007 |
| WO | WO-2013/158570 A1 | 10/2013 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

European Search Report mailed Apr. 25, 2012, for EP Patent Application No. 08022505.5, 12 pages.

Final Office Action mailed Aug. 12, 2013, for U.S. Appl. No. 12/238,333, filed Sep. 25, 2008, 19 pages.

Final Office Action mailed Aug. 13, 2013, for U.S. Appl. No. 12/238,342, filed Sep. 25, 2008, 14 pages.

Final Office Action mailed Oct. 22, 2014, for U.S. Appl. No. 12/238,342, filed Sep. 25, 2008, 16 pages.

Malik, S. et al. (2004). "Visual Touchpad: A Two-Handed Gestural Input Device," *Proceedings of the 6th International Conference on Multimodal Interfaces*, State College, PA, Oct. 13-15, 2004, *ICMI '04, ACM* pp. 289-296.

Non-Final Office Action mailed Mar. 9, 2012, for U.S. Appl. No. 12/238,342, filed Sep. 25, 2008, 26 pages.

Non-Final Office Action mailed May 3, 2012, for U.S. Appl. No. 12/238,333, filed Sep. 25, 2008, 22 pages.

Non-Final Office Action mailed Jan. 7, 2013, for U.S. Appl. No. 12/238,333, filed Sep. 25, 2008, 20 pages.

Non-Final Office Action mailed Feb. 15, 2013, for U.S. Appl. No. 12/238,342, filed Sep. 25, 2008, 15 pages.

Non-Final Office Action mailed Mar. 12, 2014, for U.S. Appl. No. 12/238,342, filed Sep. 25, 2008, 15 pages.

Non-Final Office Action mailed Sep. 18, 2014, for U.S. Appl. No. 12/238,333, filed Sep. 25, 2008, 21 pages.

Rekimoto, J. (2002). "SmartSkin: An Infrastructure for Freehand Manipulation on Interactive Surfaces," *CHI 2002*, Apr. 20-25, 2002. [(Apr. 20, 2002). 4(1):113-120.].

Wilson, A.D. (Oct. 15, 2006). "Robust Computer Vision-Based Detection of Pinching for One and Two-Handed Gesture Input," *ACM, USIT '06*, Montreux, Switzerland, Oct. 15-18, 2006, pp. 255-258.

Final Office Action mailed Apr. 22, 2015, for U.S. Appl. No. 12/238,333, filed Sep. 25, 2008, 23 pages.

Notice of Allowance mailed Dec. 1, 2015, for U.S. Appl. No. 12/238,333, filed Sep. 25, 2008, nine pages.

\* cited by examiner

RECONSTRUCTION OF ORIGINAL TOUCH IMAGE FROM DIFFERENTIAL TOUCH IMAGE

FIELD

This relates generally to a differential touch image and more specifically to reconstructing an original touch image from a differential touch image.

BACKGROUND

FIG. 1 illustrates an exemplary touch image captured by a touch sensitive device, such as a touch panel. In the example of FIG. 1, touch image 100 can include rows 101 and columns 102 of image data (depicted by small circles), where the image data values can indicate an area 110 of the device at which an object touched or hovered over the panel (depicted by a broken circle), and the remaining untouched area 120.

Two types of touch images that can be captured include an original touch image and a differential touch image, depending on the scan configuration of the device. FIG. 2 illustrates an exemplary column 102 from the touch image 100 of FIG. 1 showing what the image data 225 can look like in an original touch image and what the image data 235 can look like in a differential touch image. For explanatory purposes, the image data is shown in FIG. 2 as continuous, although it should be understood that the image data can also be discrete as illustrated in FIG. 1. In the original touch image, the image data indicative of an untouched area 225a can have a value of zero and the image data indicative of a touched area 225b can have values greater than zero, depending on the proximity of the touching or hovering object. The original touch image can include actual magnitudes of the image values. In the differential touch image, each column of image data can be balanced to have an average value of zero, i.e., having the DC information removed. As such, the image data indicative of an untouched area 235a can have a negative value and the image data indicative of a touched area 235b can have negative and positive values depending on the proximity of the touching or hovering object. As such, the column's negative and positive values can balance out to zero. The differential touch image can include differential (or relative) magnitudes of the image values.

A touch sensitive device capable of generating a differential touch image can have some advantages. For example, some device hardware used to generate an original touch image can be eliminated, thereby freeing up space to expand the device's viewing area. Also, image effects, such as thermal drift, can have little or no effect on a differential image. However, because many touch sensitive devices require the actual image value magnitudes (such as provided by an original touch image) to perform various functions, a differential touch image can have limited use.

SUMMARY

This relates to reconstructing an original touch image from a differential touch image in a touch sensitive device. A reconstruction method can include aligning columns of the differential touch image relative to each other based on image data indicative of no touch or hover ("untouched data"). Untouched data can more clearly show how much column alignment is needed compared to image data indicative of a touch or hover ("touched data"). The method can further include aligning the image to a baseline value based on the untouched data in order to restore the previously removed DC information to the differential image. The untouched data can more clearly show how much baseline alignment is needed compared to the touched data. In one example, the reconstruction can be performed using the differential image data alone. In another example, the reconstruction can be performed using the differential image data and common mode data indicative of the missing image column average. The ability to use the differential touch image to reconstruct the original touch image can advantageously provide the benefits of the differential image while performing device functions with the reconstructed original image.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to reconstructing an original touch image from a differential touch image in a touch sensitive device. A reconstruction method can include aligning columns of the differential touch image relative to each other based on image data indicative of no touch or hover ("untouched data"). Untouched data can more clearly show how much column alignment is needed compared to image data indicative of a touch or hover ("touched data"). The method can further include aligning the image to a baseline value, representative of the previously removed DC information, based on the untouched data. The untouched data can more clearly show how much baseline alignment is needed compared to the touched data. In some embodiments, the reconstruction can be performed using the differential image data alone. In other embodiments, the reconstruction can be performed using the differential image data and common mode data (i.e., output from a touch device when there is no proximate object). The ability to use the differential touch image to reconstruct the original image can advantageously provide the benefits of the differential image while also performing device functions with the reconstructed original image.

In some embodiments, the differential touch image can be a fully differential touch image. Although reconstruction from offsets based on DC balancing is described herein, it should be understood that reconstruction based on any image offsets can be performed according to various embodiments.

Figure 3:
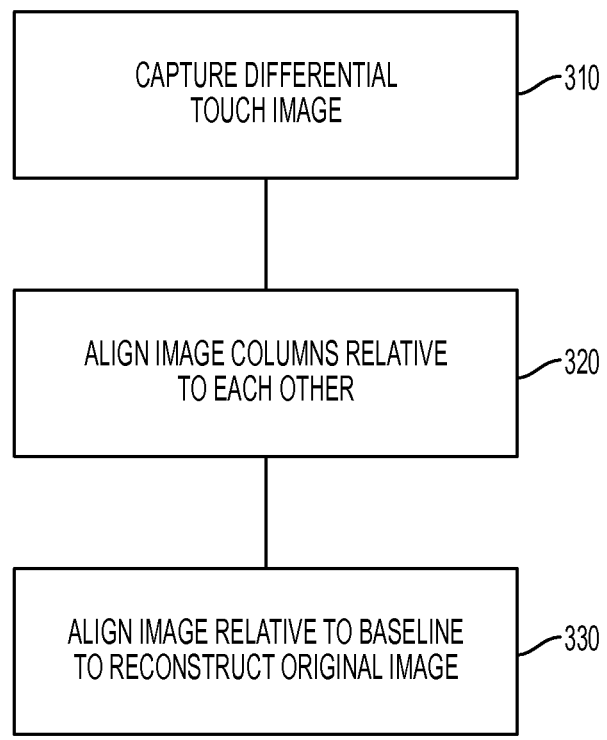
FIG. 3 illustrates an exemplary method for reconstructing an original touch image from a differential touch image according to various embodiments.

FIG. 3 illustrates an exemplary method for reconstructing an original touch image from a differential touch image. In the example of FIG. 3, a differential touch image can be captured during a differential scan of a touch panel (310). In some embodiments, the differential scan can perform a differential drive operation as follows. All the rows of the touch panel or a subset of rows can be driven during each step of the scan. For the driven rows, some can be driven with stimulation signals having positive phase and others with stimulation signals having negative phase. The static (non-signal related) capacitance that is approximately uniform across the touch panel may not appear in the output, because of the combination of positive and negative phases in the drive signals. After several scan steps in which different combinations of rows are driven with various stimulation signal phases and patterns, the difference between the touch data values can be calculated, thereby forming the differential touch image.

In some embodiments, the differential scan can perform a differential sense operation as follows. The rows of the touch panel can be driven one at a time, for example, with a stimulation signal. The sensing amplifiers on the columns of the touch panel can be differential sensing amplifiers, where each measures the difference between two columns, between a column and the average of all the other columns, or between one subset of columns and another subset of columns. The static (non-signal related) capacitance that is approximately uniform across the touch panel may not appear in the output, because the sensing amplifiers measure only differences. After the scan, the difference between the touch image values on each row may be calculated, thereby forming the differential touch image.

In some embodiments, the differential scan can combine the differential drive and differential sense operations to capture the differential touch image.

Figure 2:
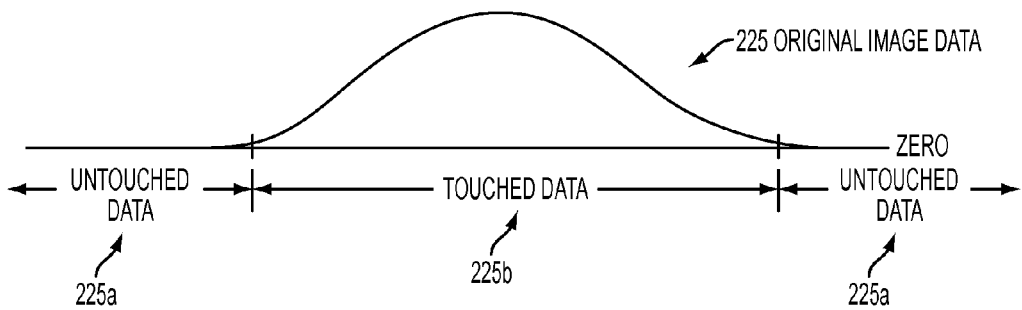
FIG. 2 illustrates an exemplary column of an original touch image and a differential touch image according to various embodiments.
Figure 2:
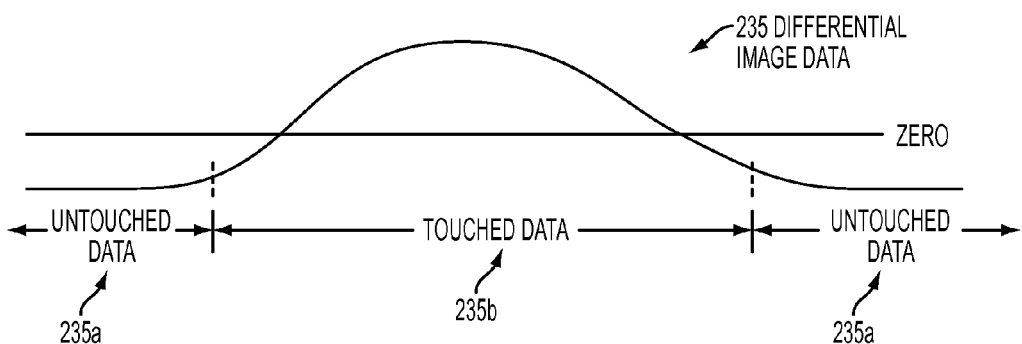

As described previously in FIG. 2, each column of image data can have an average value of zero, with untouched data being negative and touched data being negative and positive depending on the object's proximity, thereby rendering the sum of the column zero. Due to differing touch levels (as well as noise and other effects), each column of image data can have different average values. These differences can be most apparent in the untouched data, where negative values for all the columns can tend to differ. To correct these differences, the columns can be aligned relative to each other using the untouched data as a guide (320). Methods for performing the column alignment will be described in detail below.

Figure 1:
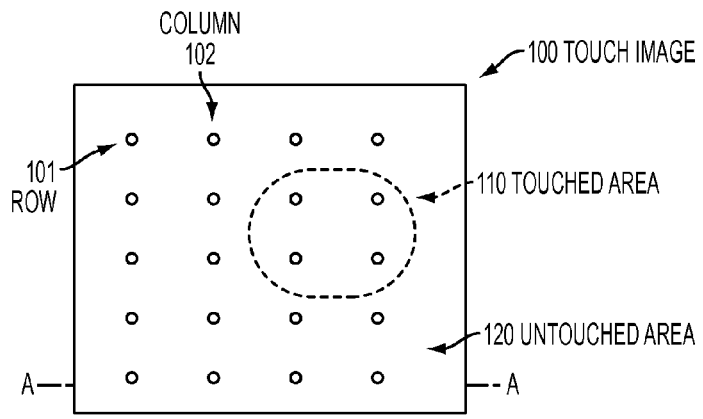
FIG. 1 illustrates an exemplary touch image according to various embodiments.
Figure 4:
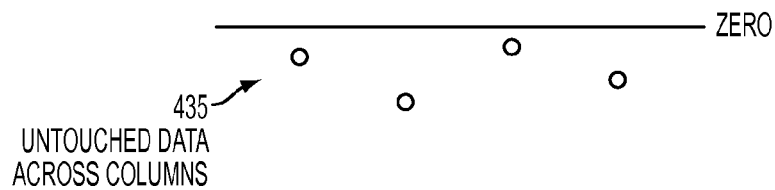
FIG. 4 illustrates an exemplary row of a differential touch image before and after column alignment according to various embodiments.
Figure 4:
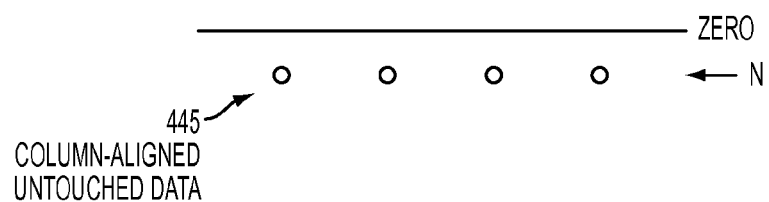

FIG. 4 illustrates an example of column alignment in the touch image of FIG. 1. In the example of FIG. 4, an exemplary row (labeled "A-A" in FIG. 1) of untouched data is shown for a differential touch image. Prior to column alignment, the row shows the erroneous differences between the untouched data values 435 (depicted by small circles) across all the columns 102 in the image. After column alignment, the row shows the untouched data values 445 across all the columns 102 having the same negative value N. The data values for the touched data in each column (not shown) can be adjusted according to the adjustments made to their corresponding untouched data.

Referring again to FIG. 3, after the columns have been aligned, the image data still lacks the DC information. This can be most apparent in the column-aligned untouched data, where the data value including the DC information should be around zero, not negative. To restore the DC information, the image can be aligned relative to a baseline value B, representative of the DC information, using the column-aligned untouched data as a guide (330). Methods for performing the baseline alignment will be described in detail below.

Figure 5:
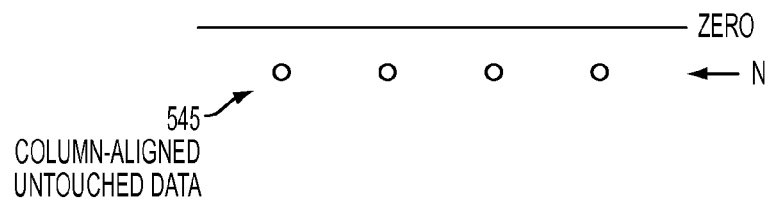
FIG. 5 illustrates an exemplary row of a differential touch image before and after baseline alignment according to various embodiments.
Figure 5:
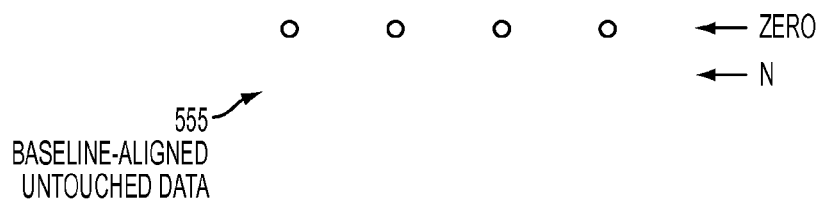

FIG. 5 illustrates an example of baseline alignment in the column-aligned row of FIG. 4. In the example of FIG. 5, an exemplary row of column-aligned untouched data from FIG. 4 is shown. Prior to baseline alignment, the row shows untouched data 545 (depicted by small circles) with a negative data value N. After baseline alignment, the row shows the image data 555 having a data value corresponding to the baseline value. In most embodiments, the baseline value is zero. The data values for the touched data in each column (not shown) can be adjusted according to the adjustments made to their corresponding untouched data, resulting in all positive values for the touched data.

Reconstructing an original touch image from a differential touch image can be formulated in mathematical terms. Mathematically, aligning the columns of a differential touch image with each other can be formulated as selecting a set of relative column offsets which minimize the row edge energy, where each edge has a weight vector associated with it. The weights can be chosen so as to weight the untouched data heavily. This is because the required column alignments cane be more apparent in the untouched data, as described previously. Mathematically, aligning the image to a baseline value can be formulated as finding an overall offset of the image which minimizes the total image energy using the edge weights. FIGS. 6 through 10 illustrate exemplary methods for performing the column and baseline alignments according to these mathematical formulations as will be described in detail below.

Figure 6:
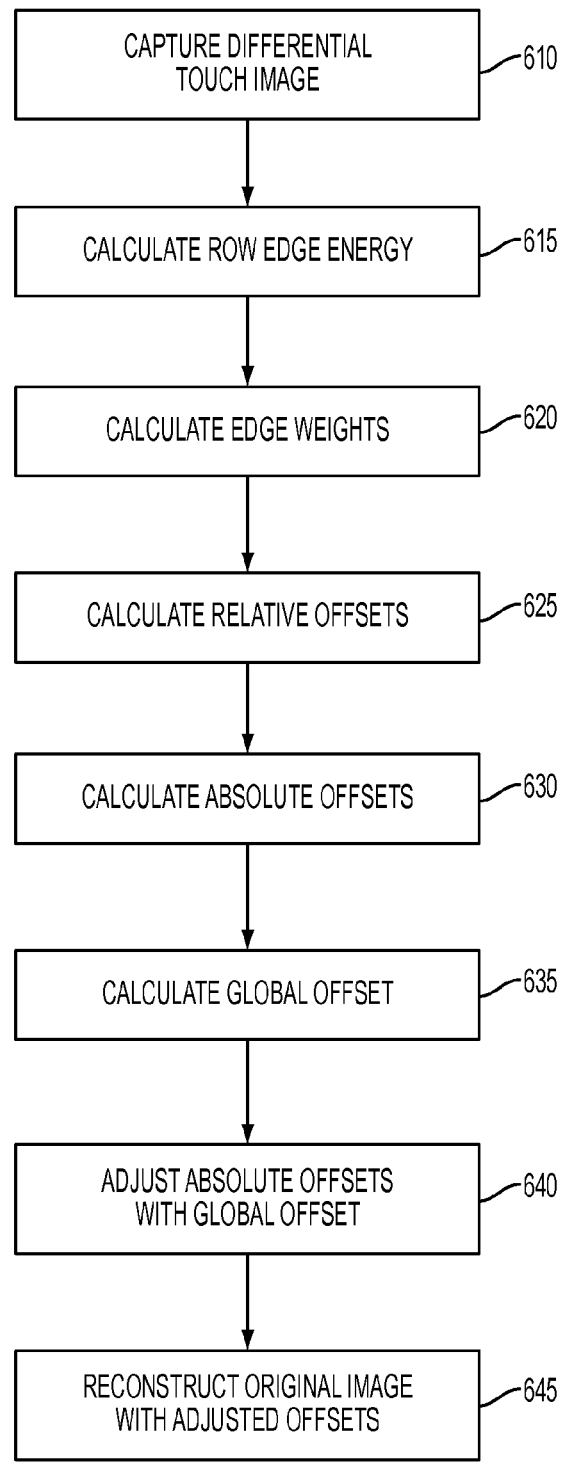
FIG. 6 illustrates an exemplary method for reconstructing an original touch image from a differential touch image based on image data according to various embodiments.

FIG. 6 illustrates an exemplary method for reconstructing an original touch image from a differential touch image using the differential image data. In the example of FIG. 6, a differential touch image can be captured during a differential scan of a touch panel (610). Consider a 3×3 differential touch image C as follows.

$$C = \begin{matrix} C_{11} & C_{12} & C_{13} \\ C_{21} & C_{22} & C_{23} \\ C_{31} & C_{32} & C_{33} \end{matrix}, \quad (1)$$

where $C_{ij}$=image data value, i=row, and j=column. For example, for 3×3 image C, $C_{23}$=the image data value for row 2 and column 3.

Row edge energy can be calculated from the image C and formed in a matrix E as follows (615).

$$E = \begin{matrix} E_{11} & E_{12} & E_{13} \\ E_{21} & E_{22} & E_{23}, \\ E_{31} & E_{32} & E_{33} \end{matrix} \quad (2)$$

where $E_{ij}$=row edge energy value defined as $(C_{ij}-C_{i,j+1})$. The first and last columns of the image C can be mathematically connected to treat the image as a cylinder for calculation purposes. For example, for 3×3 matrix E, $$E_{11}=(C_{11}-C_{12}) \quad (3)$$

$$E_{12}=(C_{12}-C_{13}) \quad (4)$$

$$E_{13}(C_{13}-C_{11}). \quad (5)$$

Weights associated with each edge can be calculated and formed in a matrix W as follows (620).

$$W = \begin{matrix} W_{11} & W_{12} & W_{13} \\ W_{21} & W_{22} & W_{23}, \\ W_{31} & W_{32} & W_{33} \end{matrix} \quad (6)$$

where $W_{ij}$=edge weight for $E_{ij}$. For example, $W_{23}$=edge weight for $E_{23}$.

The success of the column and baseline alignment can depend to some extent on choosing the appropriate edge weights. Ideally, the weights can be chosen based on the probability of the image data making up that edge being untouched data. A variety of weight calculations can be selected from. In one embodiment, $$W_{ij}=[100-(C_{ij}-MIN_j)], \quad (7)$$

where $MIN_j$=minimum data value of image column j.

In another embodiment, $$W_{ij}=[100-abs(C_{ij}-MED_j)] \quad (8)$$

where $MED_j$=median of the negative data values of image column j. Here, only the negative data values are considered because the median of the negative values can be a more robust estimator of the current baseline value of the differential touch image. The estimated baseline value of the differential image can then be indicative of the baseline alignment to be done to reconstruct the original image.

In still another embodiment, $$W_{ij}=\max[(W_{max}-abs(C_{ij}-MED_j)),W_{min}], \quad (9)$$

where $W_{min}$, $W_{max}$=minimum and maximum edge weights, respectively. These weights can be set according to design or operational parameters of the device. For example, in some embodiments, $W_{min}$=1/5, $W_{max}$=75.

In other embodiments, mode can be used instead of median, $$W_{ij}=[100-abs(C_{ij}-MOD_j)] \quad (10)$$

$$W_{ij}=\max[(W_{max}-abs(C_{ij}-MOD_j)], \quad (11)$$

where $MOD_j$=modal of the negative data value of image column j.

In other embodiments, a mean or a weighted mean of the negative data values of each image column j can be used rather than minimum, median, or mode to calculate weights, similar to Equations (7)-(11). Any other suitable image data parameters can be used according to various embodiments.

In other embodiments, any of the above weighting schemes can be used for an initial weighting. This initial weighting can then be modified to account for the presence of other non-touch/non-baseline effects, such as the negative pixel effect. One such weighting can including calculating the affected image data $N_{ij}$ as follows. $N_{ij}$=1, if there exists at least one image data value in image row i and image column j that is greater than zero. $N_{ij}$=0, otherwise. Accordingly, $$W_{ij,a}=W_{ij}-W_{ij} \cdot N_{ij} \cdot k \quad (12)$$

where k=an attenuation factor. In some embodiments, k=0.5. Here, weights $W_{ij}$ for negative pixel influenced image data can be attenuated to produce attenuated weights $W_{ij,a}$.

In the above embodiments, the edge weights can be the minimum of two weights. In other embodiments, the maximum of the two weights and their arithmetic and geometric mean can be considered.

Also, in the above embodiments, the edge weights can be determined for the general case. In other embodiments, the edge weights can be determined based on variance in the untouched data of each column. To do this, the mode of each column can be calculated and the number of occurrences of the mode determined. If the mode is sufficiently strong, i.e., the number of occurrences high, a smaller maximum edge weight and the modal formulation (Equations (10), (11)) can be used. As the mode weakens, i.e., the number of occurrences decreases, the variance can increase. If the mode is sufficiently weak, i.e., the number of occurrences is low enough, a larger edge weight can be used with the median formulation (Equations (8), (9)). This can allow the weight calculation to better reflect the available data.

Relative column offsets R, i.e., the amount of column alignment to be done for each column relative to an adjacent column, can be calculated as follows (625). First, the following mean square error for $R_j$ can be minimized, $$\Sigma_i W_{ij}(E_{ij}+R_j)^2, \quad (13)$$

where $R_j$=relative offset for image column j.

The relationship between the relative column offsets R and absolute column offsets A, i.e., the absolute amount of column alignment to be done for each column, as illustrated in Equation (17), can be formulated as follows.

$$R_j=A_j-A_{j-1}, \quad (14)$$

where $A_j$=absolute offset for image column j. The first and last columns of the differential image C can be mathematically connected to treat the image as a cylinder for calculation purposes. For example, for 3×3 image C, $R_1=A_1-A_3$.

The partial derivatives of $R_j$ can be set to zero, $$\partial R_j=2\Sigma_i W_{ij}(E_{ij}+R_j)=0 \quad (15)$$

$R_j$ can be found, $$R_j = \frac{\Sigma_i W_{ij} E_{ij}}{\Sigma_i W_{ij}}. \quad (16)$$

Absolute column offsets A can be calculated based on the relative offsets R as follows (630).

$$M_{ij}A_j = R_j,$$

$$M = \begin{matrix} 1 & -1 & 0 \\ 0 & 1 & -1 \\ -1 & 0 & 1 \end{matrix}. \quad (18)$$

Equation (18) can have multiple solutions, such that there is no true inverse of matrix M. Accordingly, a pseudo-inverse matrix P can be generated and applied as follows to get the absolute column offsets $A_j$ for each column.

$$A_j = P_{ij}R_j, \quad (19)$$

where $P_{ij}$=pseudo-inverse value of corresponding $M_{ij}$ value.

Next, a global offset $A_g$ can be calculated for the baseline alignment (635). The global offset $A_g$ can be calculated based on image data at the borders of the image, because the border data can be assumed to be untouched data, as follows.

$$A_g = \frac{\Sigma_{border} W_{ij}(C_{ij} + A_j)}{\Sigma_{border} W_{ij}}. \quad (20)$$

The global offset $A_g$ can also be formulated as a sum over the entire touch image, not just the border data.

The absolute column offsets $A_j$ can be adjusted based on the global offset as follows (640).

$$A_{j,f} = A_j + A_g, \quad (21)$$

where $A_{j,f}$=adjusted absolute offset for image column j.

The adjusted absolute offsets $A_{j,f}$ can be applied to the differential touch image C as follows (645).

$$I_{ij} = C_{ij} + A_{j,f}, \quad (22)$$

where $I_{ij}$=reconstructed original touch image data from differential touch image data $C_{ij}$.

Applying the offsets $A_{j,f}$ can align the columns of the image C relative to each other and the image to the baseline, thereby reconstructing an original touch image I from the differential touch image C.

Although the example refers to 3×3 matrices, it is to be understood that the method applies to any suitable matrix sizes according to various embodiments.

An inverted baseline can occur when a touching or hovering object is present at the time that a baseline value for the touch panel is established. This can be problematic in a differential touch image because the inherent DC balancing of the image data can make the inverted case look like an intended actual touch or hover and because the current baseline value is estimated based on the median of the negative touch values (as described previously). For example, a differential touch image with a single inverted touch or hover can appear as two touching or hovering objects in the reconstructed original touch image.

Figure 7A:
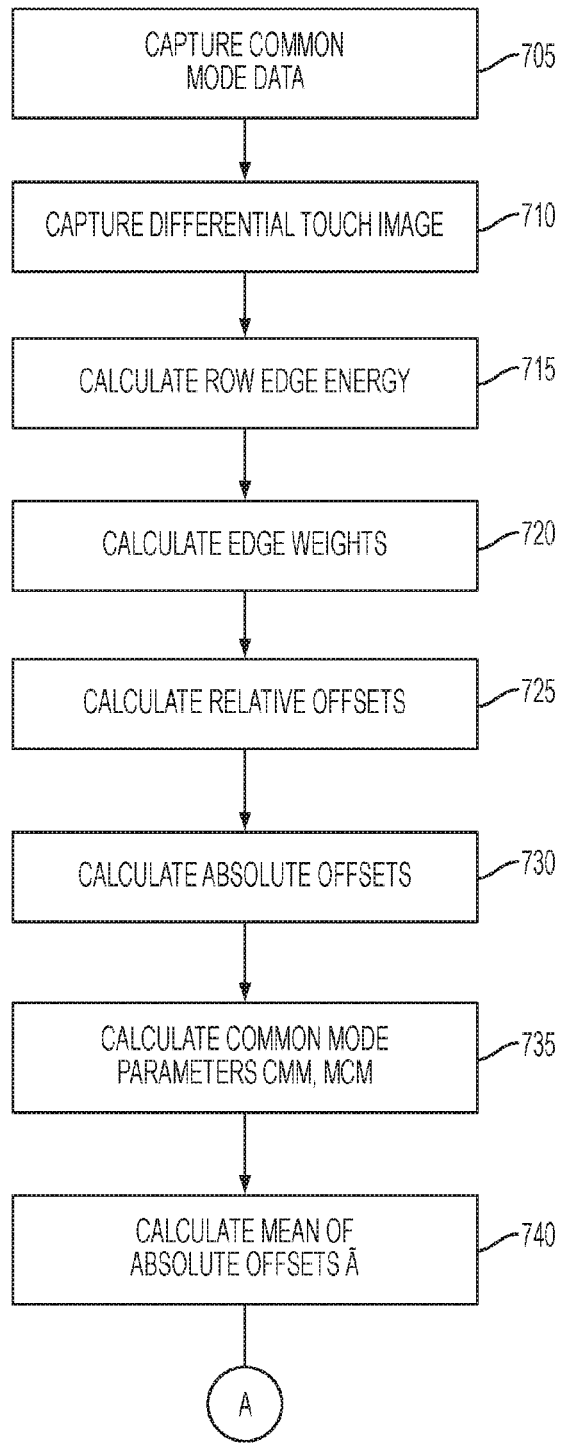
FIGS. 7A-7B illustrate an exemplary method for detecting baseline inversion in a differential touch image according to various embodiments.
Figure 7B:
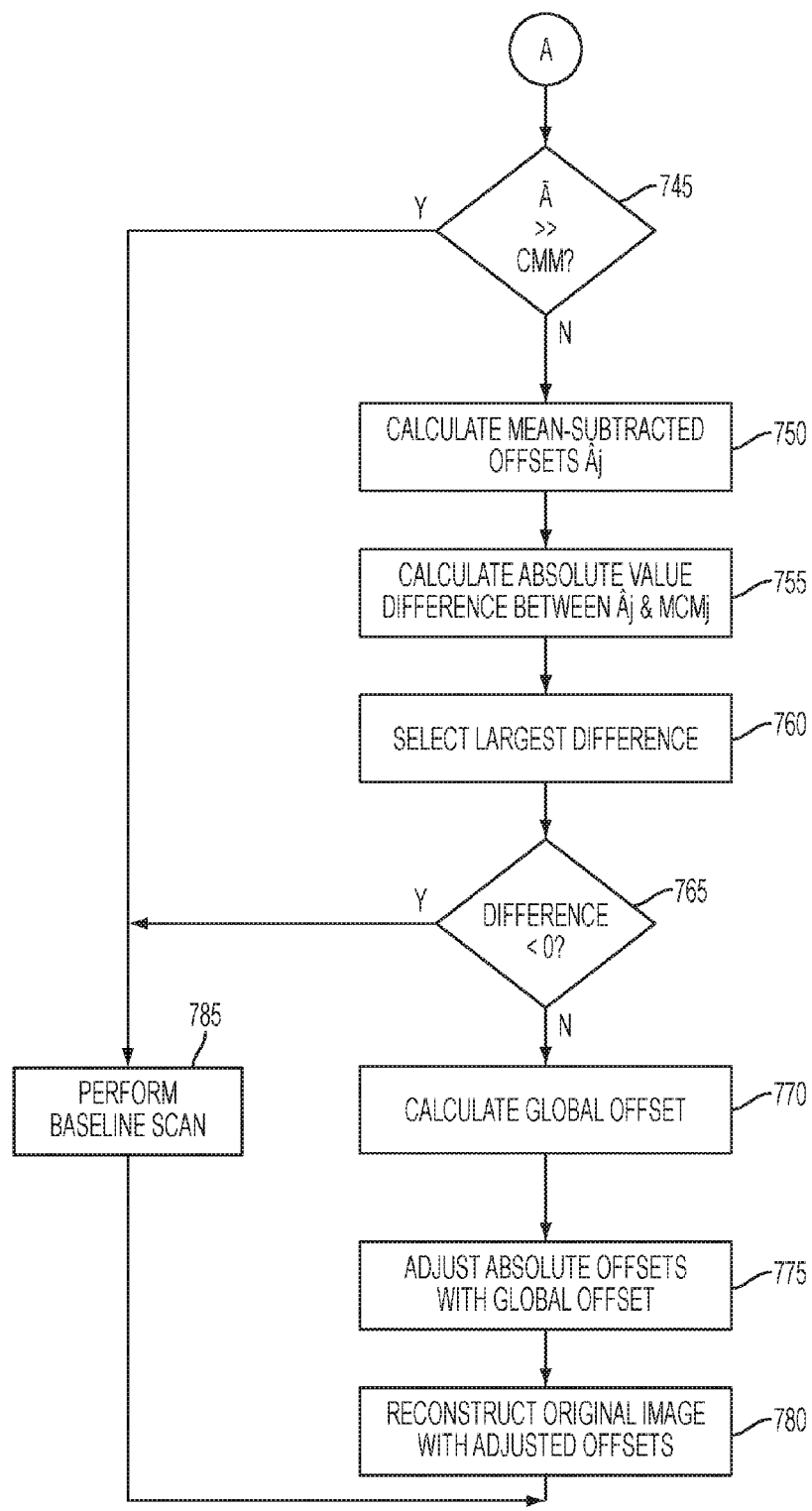

FIGS. 7A-7B illustrate an exemplary method for detecting these inversions in the method of FIG. 6. In the example of FIGS. 7A-7B, common mode data can be captured at the touch panel (705). Common mode data can refer to data output from a touch panel when the rows in the panel are driven simultaneously, for example. In other words, common mode data can be the average values for the image columns. Note that the common mode data need not be accurate, i.e., need not have low noise and/or variance. Common mode data can be captured during a separate scan period than the differential touch image scan period. In some embodiments, multiple scans can be performed to capture common mode data for each column and the captured data averaged to provide an average common mode value for each column.

The method of FIGS. 7A-7B can then proceed in a similar manner as the method of FIG. 6 (blocks 610-630) to capture a differential touch image C (710), calculate row edge energy E (715), calculate edge weights W (720), calculate relative column offsets R (725), and calculate absolute column offsets A (730).

After calculating the offsets A (730), common mode parameters can be calculated based on the captured common mode data as follows (735). The common mode mean CMM is $$CMM = \frac{\Sigma_j CM_j}{n_{cols}}, \quad (23)$$

where $CM_j$=common mode data, and $n_{cols}$=number of columns j in the image. The mean-subtracted common mode MCM is $$MCM_j = CM_j - CMM. \quad (23)$$

The mean $\overline{A}$ of the absolute column offsets A can be calculated as follows (740). The offsets A can effectively be an estimate of the common mode data.

$$\overline{A} = \frac{\Sigma_j A_j}{n_{cols}}. \quad (25)$$

A first inversion detection test can be performed, in which a comparison can be made between the offset mean and the common mode mean (745). If the common mode mean CMM is substantially smaller than the offset mean $\overline{A}$, a large-scale inversion is likely present. A panel scan can be performed to capture another baseline (785) and the reconstruction can be stopped for this image. If a large-scale inversion is not detected, a second inversion detection test can be performed to look for a smaller scale inversion as described below.

First, the mean-subtracted column offsets for each column $\hat{A}_j$ can be calculated as follows (750).

$$\hat{A}_j = A_j - \overline{A}. \quad (26)$$

The second inversion detection test can compare the mean-subtracted column offsets $\hat{A}_j$ to the mean-subtracted common mode values $MCM_j$ for each column (755). The column with the largest absolute value between the two can be selected (760). For that column, if the signed difference is substantially negative, an inversion is likely present. A panel scan can be performed to capture another baseline (785) and the reconstruction can be stopped for this image. If a smaller scale inversion is not detected, the image data can be deemed inversion-free.

The method can then perform in a similar manner as FIG. 6 (blocks 635-645) for the inversion-free data to calculate a global offset $A_g$ (770), adjust the absolute column offsets A with the global offset $A_g$ (775), and apply the adjusted offset $A_{j,f}$ to the differential touch image C to reconstruct an original touch image I (780).

Figure 8A:
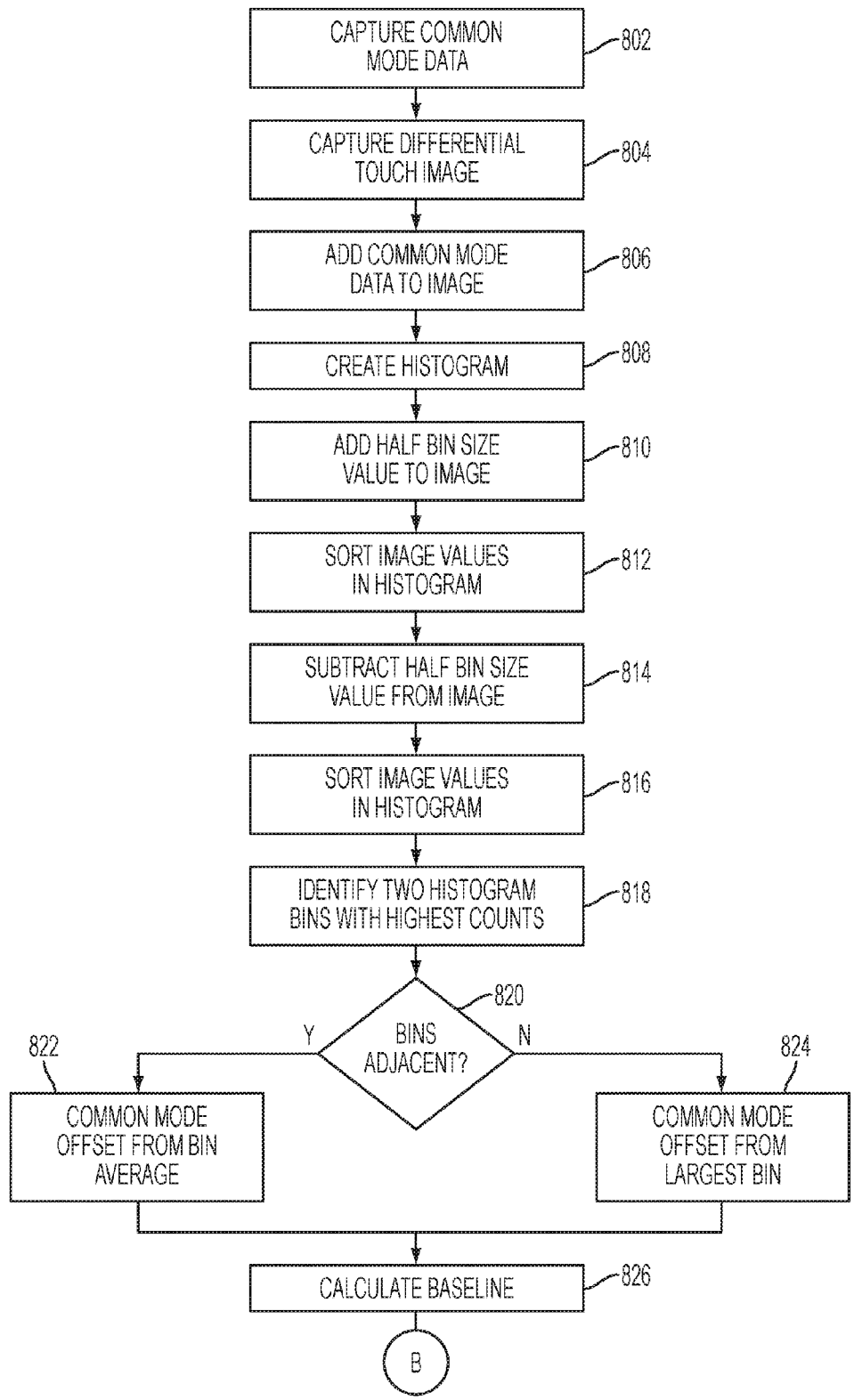
FIGS. 8A-8B illustrate an exemplary method for reconstructing an original touch image from a differential touch image based on image data and common mode data according to various embodiments.
Figure 8B:
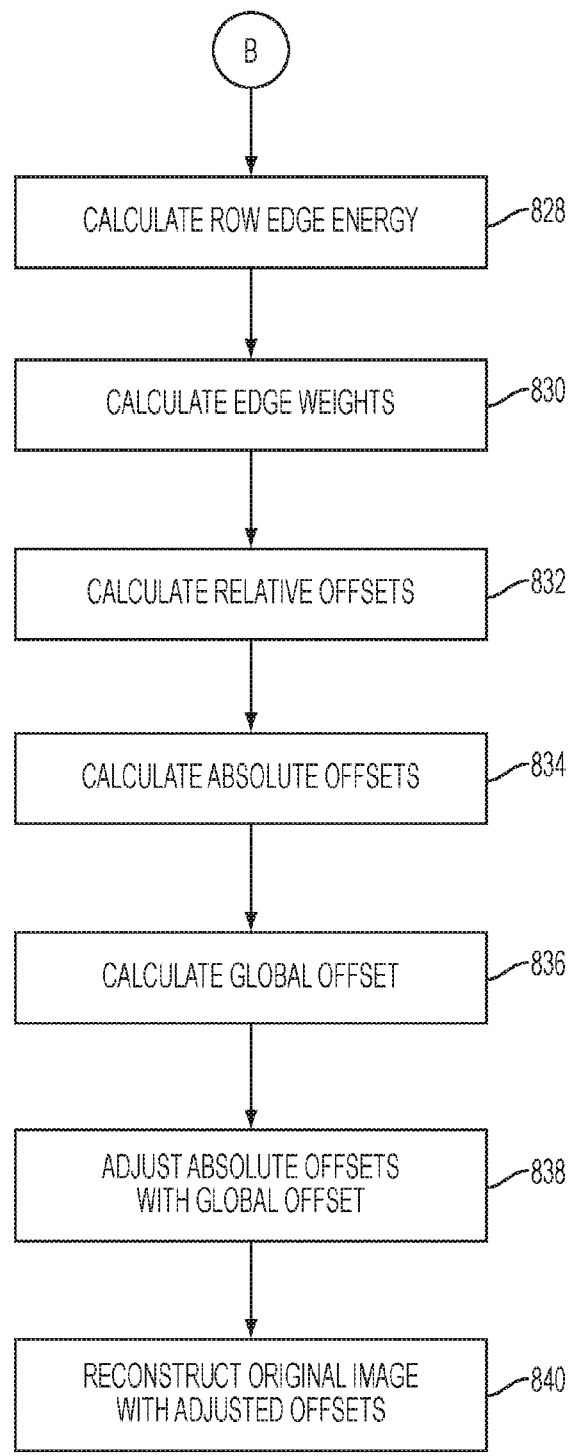

FIGS. 8A-8B illustrate an exemplary method for reconstructing an original touch image from a differential touch image using differential image data and common mode data. The method of FIGS. 8A-8B is similar to the method of FIG.

6 with the addition of the use of common mode data to estimate the baseline value of an image column (rather than using a median of the negative touch values), thereby bypassing the inversion detection method of FIGS. 7A-7B.

In the example of FIGS. 8A-8B, common mode data CM can be captured at a touch panel in a similar manner as described in FIGS. 7A-7B (802). A differential touch image C can be captured at the touch panel in a similar manner as described in FIG. 6 (804). The common mode data CM can be added to the captured image touch data C to create new image C' as follows (806).

$$C'_{ij}=C_{ij}+CM_j. \tag{27}$$

The common mode data can include substantial noise in some instances, which can lead to significant variations between successive captured images. To reduce the noise effects, a histogram approach can be used to estimate a common mode mean offset $CM_o$ as follows, under the assumption that most of the image data is untouched data, e.g., data indicative of no touching or hovering object. First, histogram bins over the range of data values in image C' can be generated for a desired bin size (808). For example, in some embodiments, the bin size can be 16. For each data value in image C' that falls into a given bin, that bin's count can be incremented by 2.

Half of the bin size can be added to the image C' to produce image $C^{(2)}$ (810). For example, in some embodiments, for a bin size of 16, a value of 8 can be added to each data value $C'_{ij}$ in the image C'. For each new data value (increased by half the bin size) in image $C^{(2)}$ that falls into a given bin of the histogram, that bin's count can be incremented by 1 (812). Half the bin size can then be subtracted from the image C' to produce image $C^{(3)}$ (814). For example, in some embodiments, for a bin size of 16, a value of 8 can be subtracted from each data value $C'_{ij}$ in the image C'. For each new data value (decreased by half the bin size) in image $C^{(3)}$ that falls into a given bin of the histogram, that bin's count can be incremented by 1 (816).

The histogram bins with the highest and second highest counts can be identified (818). If the identified bins are adjacent (820), the common mode mean offset $CM_o$ can be the weighted average of the center values for the two bins (822). If not, the common mode mean offset $CM_o$ can be the center value of the identified highest-count bin. (824). The offsets $CM_o$ can be subtracted from the common mode values $CM_j$ as follows (826).

$$BASE_j=CM_j-CM_o. \tag{28}$$

These resulting values BASEj can be estimates of the baseline values for the image columns.

Next, the method of FIGS. 8A-8B can perform in a similar manner as the method of FIG. 6 (blocks 615-645). Row edge energy can be calculated (828). Edge weights W can be calculated using $BASE_j$ as follows.

$$W_{ij}=[100-abs(C_{ij}-BASE_j)]. \tag{29}$$

Equation (29) is similar to Equation (8) with $BASE_j$ replacing $MED_j$. Relative column offsets R can be calculated (832). Absolute column offsets A can be calculated (834). A global offset $A_g$ can be calculated (836). The absolute column offsets A can be adjusted with the global offset $A_g$ (838). The adjusted offsets $A_{j,f}$ can be applied to the differential touch image C to reconstruct an original touch image I (840).

Figure 9A:
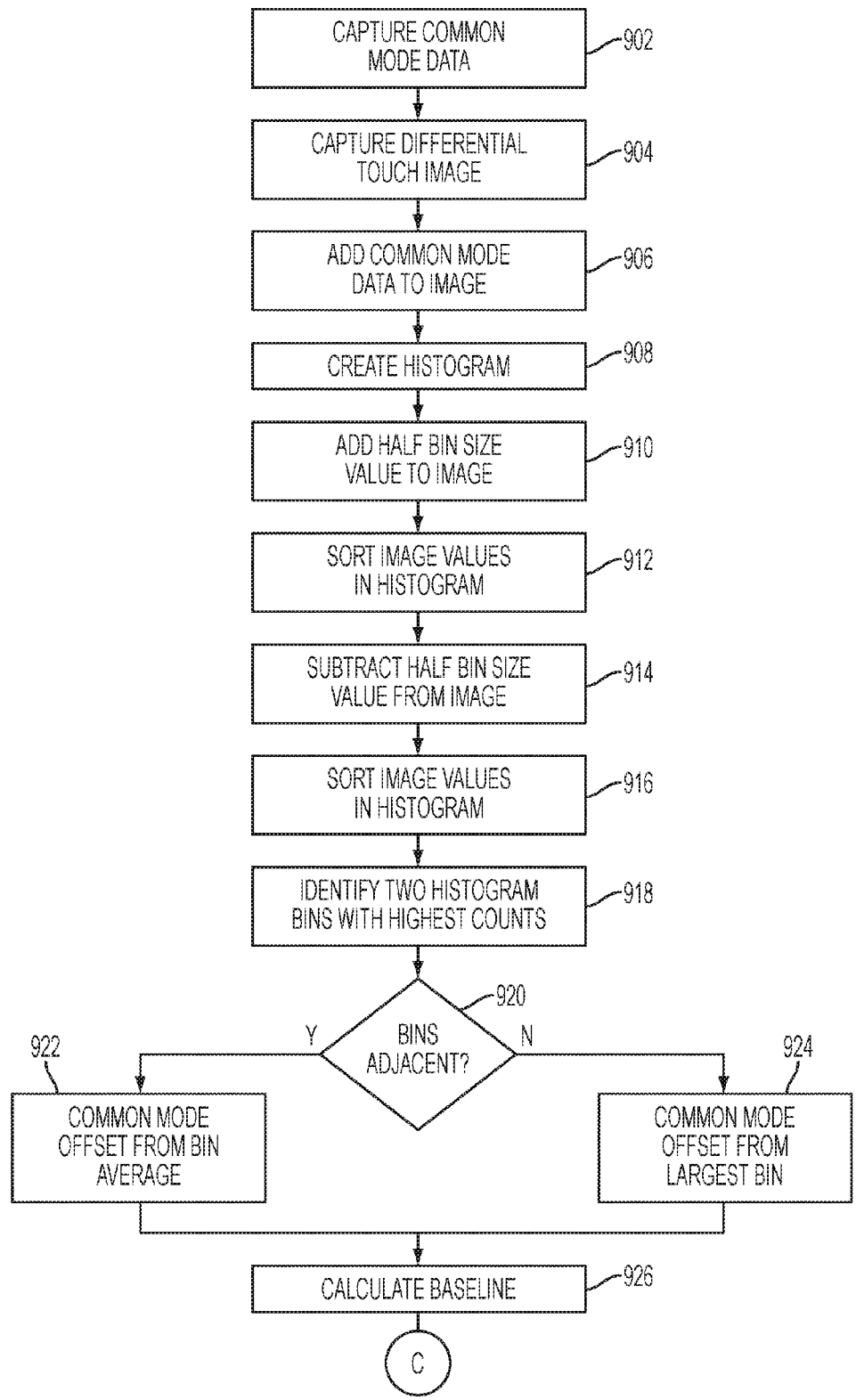
FIGS. 9A-9B illustrate another exemplary method for reconstructing an original touch image from a differential touch image based on image data and common mode data according to various embodiments.
Figure 9B:
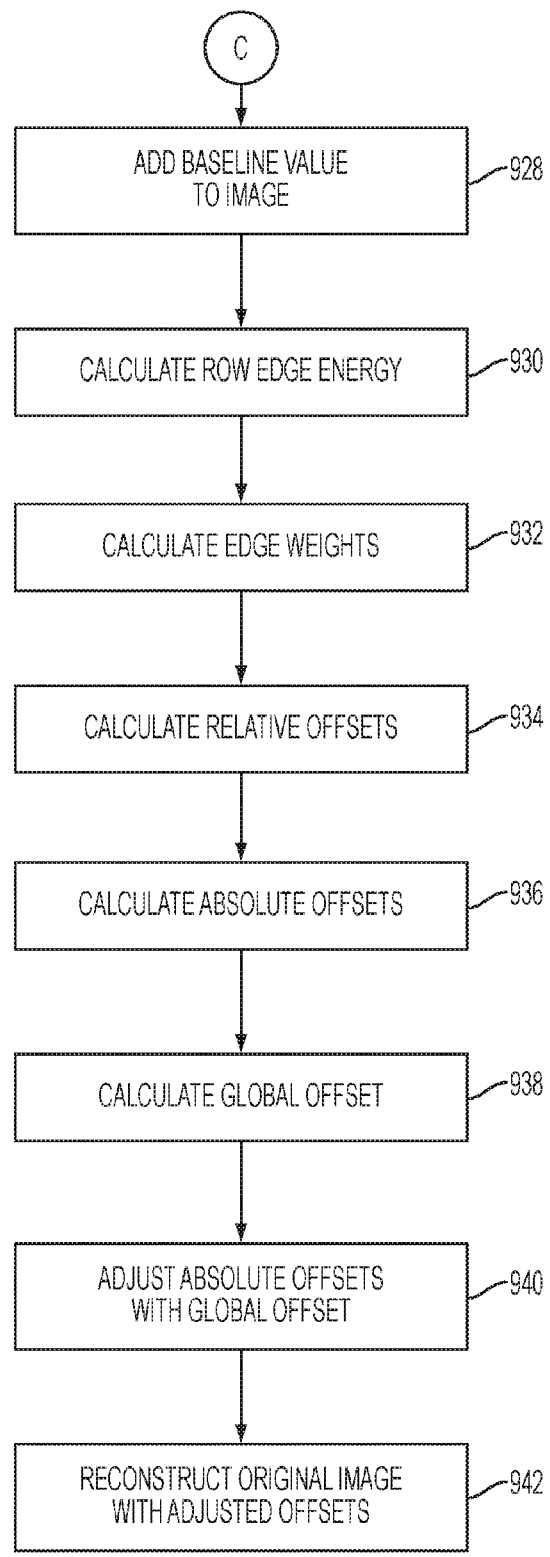

FIGS. 9A-9B illustrate another exemplary method for reconstructing an original touch image from a differential touch image using differential image data and common mode data. The method of FIGS. 9A-9B is similar to the method of FIGS. 8A-8B with the differences noted below. In the example of FIGS. 9A-9B (similar to FIGS. 8A-8B in blocks 802-826), common mode data can be captured (902), a differential touch image C captured (904), the common mode data CM added to the captured image C (906), and the histogram approach applied (908-926).

Common mode errors, such as noise and other errors, can directly couple into the reconstructed original touch image. To minimize these effects, common mode data can be limited to being used to directly reconstruct the original touch image only when there is no other source of information about the magnitudes of the differential image columns. The sum of the edge weights along a given edge, e.g., $W_{11}$, $W_{21}$, $W_{31}$, etc., formed by image columns 1 and 2, can be indicative of the amount of magnitude information available for performing column alignment. This knowledge can be integrated into the method as follows.

After using the histogram approach to calculate $BASE_j$, estimates of the baseline values for the image columns (926), $BASE_j$ can be added to the differential touch image C to form image C' as follows (928).

$$C'_{ij}=C_{ij}+BASE_j. \tag{30}$$

The row edge energy can be calculated for image C' (930) in a similar manner as the method of FIGS. 8A-8B (block 828). Edge weights W can be calculated as follows.

$$W_{ij}=\max[(W_{max}-abs(C_{ij})),W_{min}]. \tag{31}$$

If common mode data is trustworthy, a penalty term can be applied for deviating from direct reconstruction, i.e., adding the common mode data to the differential image data to directly to reconstruct the original touch image, making the mean square error for $R_j$, $$\Sigma_{ij}W_{ij}(E_{ij}+R_j)^2+\gamma R_j^2, \tag{32}$$

where $\gamma$=a penalty factor. In general, $\gamma$ can be inversely proportional to common mode noise. For example, in some embodiment, $\gamma$=1.0. If a differential image column includes mostly touched data, i.e., data that indicates a touching or hovering object, the method can weigh more heavily toward direct reconstruction because of the limited amount of untouched data, i.e., data that does not indicate a touching or hovering object, in that column to perform the column and baseline alignment.

To minimize the mean square error, the partial derivatives of $R_j$ can be set to zero, $$\partial R_j=2\Sigma_i W_{ij}(E_{ij}+R_j)+2\gamma R_j=0. \tag{33}$$

$R_j$ can be found, $$R_j = \frac{\Sigma_i W_{ij} E_{ij}}{\Sigma_i W_{ij} + \gamma}. \tag{34}$$

Next, the method of FIGS. 9A-9B can perform in a similar manner as the method of FIGS. 8A-8B (blocks 834-840) to calculate absolute column offsets A (936), calculate a global offset $A_g$ (938), adjust the absolute column offsets A with the global offset $A_g$ (940), and apply the adjusted offsets $A_{j,f}$ to the differential touch image C to reconstruct an original touch image I (942).

Figure 10:
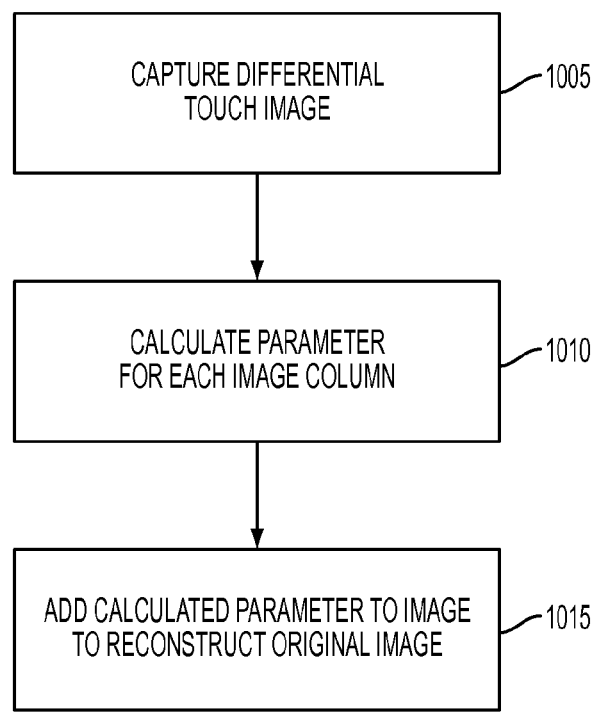
FIG. 10 illustrates another exemplary method for reconstructing an original touch image from a differential touch image based on image data according to various embodiments.

FIG. 10 illustrates another exemplary method for reconstructing an original touch image from a differential touch image using the differential image data. In the example of FIG. 10, a differential touch image C can be captured (1005). In some embodiments, a minimum data value $MIN_j$ for each image column j can be calculated (1010). The minimum data value can be added to the differential image data, thereby reconstructing the original touch image I from the differential touch image C as follows (1015).

$$I_{ij}=C_{ij}-MIN_j. \quad (35)$$

In some embodiments, a median $MED_j$ of the negative data values of image column j can be calculated rather than $MIN_j$ (1010). The median can be added to the differential image data, thereby reconstructing the original touch image I from the differential touch image C as follows (1015).

$$I_{ij}=C_{ij}-MED_j. \quad (36)$$

In some embodiments, a mode $MOD_j$ of the negative data values of image column j can be calculated rather than $MIN_j$ or $MED_j$ (1010). The mode can be added to the differential image data, thereby reconstructing the original touch image I from the differential touch image C as follows (1015).

$$I_{ij}=C_{ij}-MOD_j. \quad (37)$$

In some embodiments, a mean or a weighted mean of the negative data values of each image column j can be calculated rather than $MIN_j$, $MED_j$, or $MOD_j$ and then added to the differential image data to reconstruct the original touch image, similar to Equations (35)-(37). Any other suitable image data parameters can be used according to various embodiments.

It is to be understood that reconstruction methods are not limited to those of FIGS. 6 through 10, but can include other or additional actions capable of reconstructing an original touch image from a differential touch image according to various embodiments. It is further to be understood that the methods are not limited to differential touch images, but can be applied to any appropriate images in need of reconstruction. Although reconstruction from offsets due to DC balancing is described, it is to be understood that the methods can be used to correct for any arbitrary set of column offsets.

Figure 11:
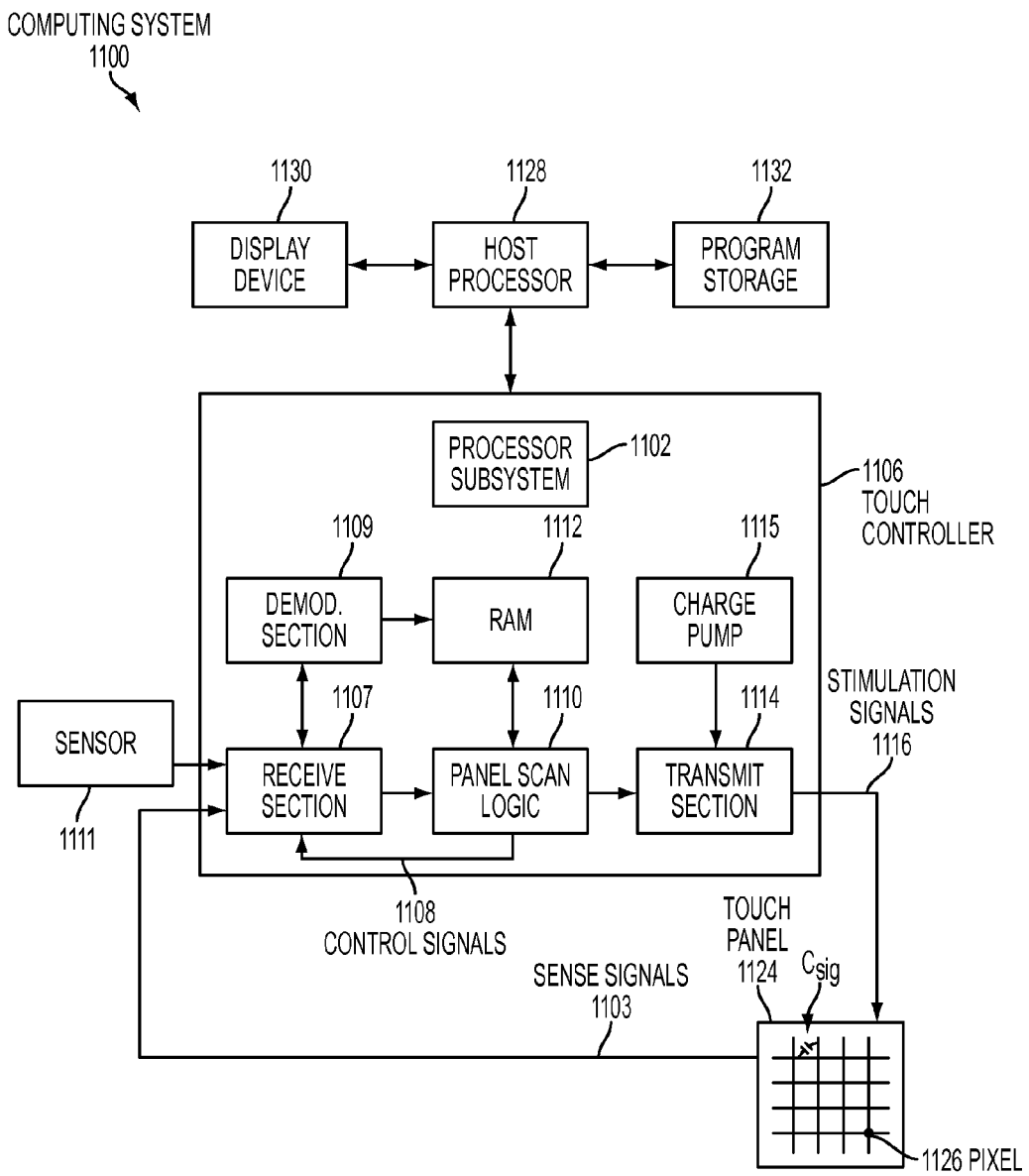
FIG. 11 illustrates an exemplary computing system that can perform original touch image reconstruction according to various embodiments.

FIG. 11 illustrates an exemplary computing system 1100 that can reconstruct an original touch image from a differential touch image according to various embodiments. In the example of FIG. 11, computing system 1100 can include touch controller 1106. The touch controller 1106 can be a single application specific integrated circuit (ASIC) that can include one or more processor subsystems 1102, which can include one or more main processors, such as ARM968 processors or other processors with similar functionality and capabilities. However, in other embodiments, the processor functionality can be implemented instead by dedicated logic, such as a state machine. The processor subsystems 1102 can also include peripherals (not shown) such as random access memory (RAM) or other types of memory or storage, watchdog timers and the like. The touch controller 1106 can also include receive section 1107 for receiving signals, such as touch signals 1103 of one or more sense channels (not shown), other signals from other sensors such as sensor 1111, etc. The touch controller 1106 can also include demodulation section 1109 such as a multistage vector demodulation engine, panel scan logic 1110, and transmit section 1114 for transmitting stimulation signals 1116 to touch sensor panel 1124 to drive the panel. The panel scan logic 1110 can access RAM 1112, autonomously read data from the sense channels, and provide control for the sense channels. In addition, the panel scan logic 1110 can control the transmit section 1114 to generate the stimulation signals 1116 at various frequencies and phases that can be selectively applied to rows of the touch sensor panel 1124.

The touch controller 1106 can also include charge pump 1115, which can be used to generate the supply voltage for the transmit section 1114. The stimulation signals 1116 can have amplitudes higher than the maximum voltage by cascading two charge store devices, e.g., capacitors, together to form the charge pump 1115. Therefore, the stimulus voltage can be higher (e.g., 6V) than the voltage level a single capacitor can handle (e.g., 3.6V). Although FIG. 11 shows the charge pump 1115 separate from the transmit section 1114, the charge pump can be part of the transmit section.

Touch sensor panel 1124 can include a capacitive sensing medium having drive lines and multiple strips of sense lines according to various embodiments. The drive and sense line strips can be formed from a transparent conductive medium such as Indium Tin Oxide (ITO) or Antimony Tin Oxide (ATO), although other transparent and non-transparent materials such as copper can also be used. The drive lines and sense line strips can be formed on a single side of a substantially transparent substrate separated by a substantially transparent dielectric material, on opposite sides of the substrate, on two separate substrates separated by the dielectric material, etc.

Computing system 1100 can also include host processor 1128 for receiving outputs from the processor subsystems 1102 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 1128 can also perform additional functions that may not be related to panel processing, and can be coupled to program storage 1132 and display device 1130 such as an LCD display for providing a UI to a user of the device. In some embodiments, the host processor 1128 can be a separate component from the touch controller 1106, as shown. In other embodiments, the host processor 1128 can be included as part of the touch controller 1106. In still other embodiments, the functions of the host processor 1128 can be performed by the processor subsystem 1102 and/or distributed among other components of the touch controller 1106. The display device 1130 together with the touch sensor panel 1124, when located partially or entirely under the touch sensor panel or when integrated with the touch sensor panel, can form a touch sensitive device such as a touch screen.

Note that one or more of the functions described above can be performed, for example, by firmware stored in memory (e.g., one of the peripherals) and executed by the processor subsystem 1102, or stored in the program storage 1132 and executed by the host processor 1128. The firmware can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any non-transitory medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any non-transitory medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the touch panel is not limited to touch, as described in FIG. 11, but can be a proximity panel or any other panel according to various embodiments. In addition, the touch sensor panel described herein can be either a single-touch or a multi-touch sensor panel.

It is further to be understood that the computing system is not limited to the components and configuration of FIG. 11, but can include other and/or additional components in various configurations capable of compensating for a negative pixel effect according to various embodiments.

Figure 12:
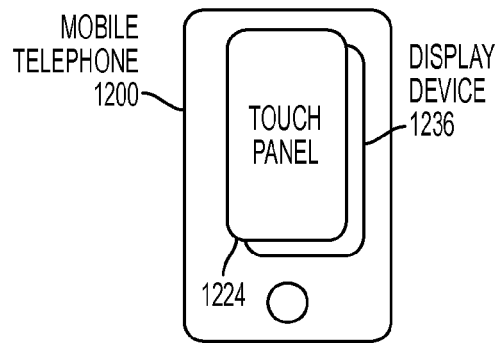
FIG. 12 illustrates an exemplary mobile telephone that can perform original touch image reconstruction according to various embodiments.

FIG. 12 illustrates an exemplary mobile telephone 1200 that can include touch sensor panel 1224, display 1236, and other computing system blocks, capable of reconstructing an original touch image from a differential touch image according to various embodiments.

Figure 13:
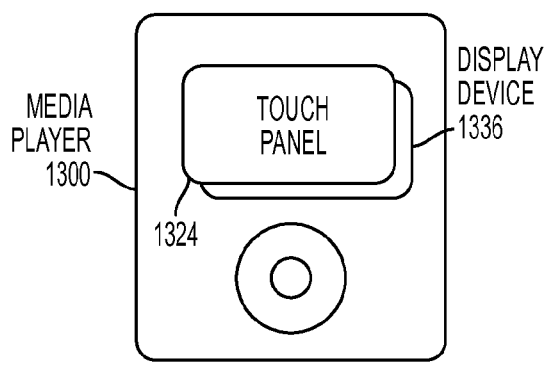
FIG. 13 illustrates an exemplary digital media player that can perform original touch image reconstruction according to various embodiments.

FIG. 13 illustrates an exemplary digital media player 1300 that can include touch sensor panel 1324, display 1336, and other computing system blocks, capable of reconstructing an original touch image from a differential touch image according to various embodiments.

Figure 14:
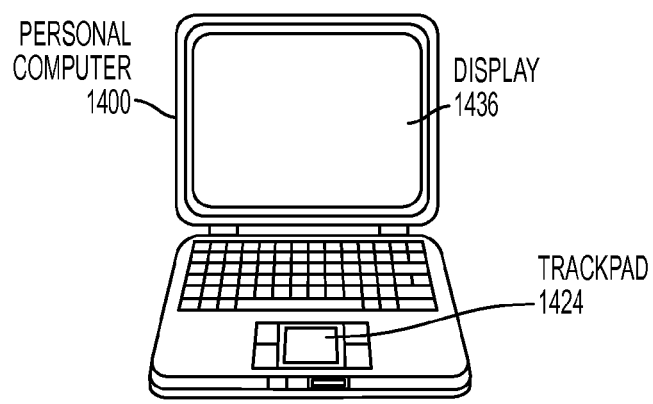
FIG. 14 illustrates an exemplary portable computer that can perform original touch image reconstruction according to various embodiments.

FIG. 14 illustrates an exemplary personal computer 1400 that can include touch sensor panel (trackpad) 1424, display 1436, and other computing system blocks, capable of reconstructing an original touch image from a differential touch image according to various embodiments.

The mobile telephone, media player, and personal computer of FIGS. 12 through 14 can realize improved accuracy with capability to reconstruct an original touch image from a differential touch image according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method for reconstructing a first image from a second image comprising:
 capturing the second image on a touch sensitive device;
 aligning columns of image data in the second image with each other such that the columns have a common value, wherein an amount of adjustment used to align each respective column of the columns is based at least in part on data associated with the respective column and data associated with at least one other column; and
 aligning the column-aligned image data with a baseline value to reconstruct the first image.

2. The method of claim 1, wherein the reconstruction is based on the image data alone.

3. The method of claim 1, wherein:
 the amount of adjustment used to align each respective column of the columns comprises an offset for each column, and
 aligning columns of image data comprises calculating the offset for each column, the offset indicative of the amount of misalignment of the column with the other columns.

4. The method claim 1, wherein aligning the column-aligned image data comprises calculating a global offset for the column-aligned image data, the offset indicative of the amount of alignment to reach the baseline value.

5. The method of claim 1, further comprising:
 capturing common mode data associated with the second image, wherein the reconstruction is based on the image data and the common mode data.

6. The method of claim 5, wherein:
 the amount of adjustment used to align each respective column of the columns comprises an offset for each column, and
 aligning columns of image data comprises:
  estimating a baseline value for each column based on the common mode data; and
  calculating the offset for each column based on the estimated baseline value, the offset indicative of the amount of alignment for the column with the other columns.

7. The method of claim 5, wherein aligning the column-aligned image data comprises:
 estimating a baseline value for each column based on the common mode data; and
 calculating a global offset for the column-aligned image data based on the estimated baseline value, the offset indicative of the amount of alignment to reach the baseline value.

8. The method of claim 5, wherein:
 the amount of adjustment used to align each respective column of the columns comprises an offset for each column, and
 aligning columns of image data comprises:
  selectively utilizing the common mode data; and
  calculating the offset for each column based on the selectively utilized common mode data, the offset indicative of the amount of misalignment of the column with other columns.

9. The method of claim 5, wherein aligning the column-aligned image data comprises:
 selectively utilizing the common mode data; and
 calculating a global offset from the column-aligned image data based on the selectively utilized common mode data, the offset indicative of the amount of alignment to reach the baseline value.

10. The method of claim 1, further comprising: detecting an erroneous baseline value from the image data of the second image.

11. A method for reconstructing an original touch image from a differential touch image comprising:
 capturing the differential touch image at a touch sensitive device;
 performing a column alignment to align columns of the differential touch image with each other such that the columns have a common value, wherein an amount of adjustment used to align each respective column of the columns is based at least in part on data associated with the respective column and data associated with at least one other column; and performing a baseline alignment to align the column-aligned differential touch image with a baseline value, resulting in the reconstructed original touch image.

12. The method of claim 11, wherein capturing the differential touch image comprises performing a differential scan of the device to provide image data in each column of the differential touch image having a normalized sum of zero.

13. The method of claim 11, wherein performing a column alignment comprises utilizing image data of the differential touch image corresponding to untouched regions of the device.

14. The method of claim 11, wherein performing a baseline alignment comprises utilizing image data of the differential touch image corresponding to untouched regions of the device.

15. A method for reconstructing an original touch image from a differential touch image, comprising:
capturing the differential touch image at a touch sensitive device;
capturing common mode data at the device;
performing a column alignment to align columns of the differential touch image to each other based on the captured common mode data; and
performing a baseline alignment to align the column-aligned differential touch image with a baseline value based on the captured common mode data, resulting in the reconstructed original touch image.

16. The method of claim 15, comprising:
estimating a second baseline value for the differential touch image based on the captured common mode data; and
utilizing the estimated second baseline value for the column and baseline alignments.

17. The method of claim 16, wherein estimating the second baseline value comprises:
sorting image data of the differential touch image having the captured common mode data applied thereto among bins of a histogram; and
identifying the bins having highest counts, the identified bins indicative of the second baseline value.

18. A method for reconstructing an original touch image from a differential touch image, comprising:
capturing the differential touch image at a touch sensitive device;
capturing common mode data at the device;
weighting the captured common mode data;
performing a column alignment to align columns of the differential touch image to each other based on the weighting; and
performing a baseline alignment to align the column-aligned differential touch image with a baseline value based on the weighting, resulting in the reconstructed original touch image.

19. The method of claim 18, comprising:
estimating a second baseline value for the differential touch image based on the captured common mode data; and
weighting the second baseline value along with the captured common mode data.

20. The method of claim 19, wherein weighting the captured common mode data comprises:
weighting the captured common mode data more heavily when non-touch image data in the differential touch image is limited, the non-touch data indicative of lack of a proximate object.

21. A method for reconstructing an original touch image from a differential touch image, comprising:
capturing the differential touch image at a touch sensitive device:
calculating a parameter associated with at least some column data of the differential touch image;
applying the parameter to the differential touch image to align columns of the differential touch image such that the columns have a common value; and
reconstructing the original touch image.

22. The method of claim 21, wherein the parameter is at least one of a minimum, a median, a mode, a mean, or a weighted mean of the at least some column data.

23. A touch sensitive device comprising:
a touch panel capable of sensing a proximate object;
scan logic couplable to the touch panel and capable of performing a scan of the touch panel so as to capture a first touch image; and
a processor capable of reconstructing a second touch image from the first touch image, the reconstructing including:
calculating first alignments for portions of the first touch image, each portion having a different first alignment,
aligning the portions with each other according to the first alignments to form an aligned first image such that the portions have a common value, wherein an amount of adjustment used to align each respective portion of the portions is based at least in part on data associated with the respective portion and data associated with at least one other portion,
calculating a second alignment for the aligned first image, and
aligning the aligned first image according to the second alignment to meet a baseline value so as to form the reconstructed second touch image.

24. The device of claim 23, wherein the first image is a differential touch image and the second image is an original touch image.

25. The device of claim 23 comprising at least one of a computer, a media player, or a mobile telephone.

* * * * *